United States Patent [19]

Yamamoto et al.

[11] Patent Number: 5,701,216
[45] Date of Patent: Dec. 23, 1997

[54] SHUTTER MECHANISM FOR DISK DRIVE CARTRIDGE INSERTION OPENING

[75] Inventors: Hiroshi Yamamoto; Suguru Takishima; Shimpei Shinozaki, all of Tokyo, Japan

[73] Assignee: Asahi Kogaku Kogyo Kabushiki Kaisha, Tokyo, Japan

[21] Appl. No.: 599,339

[22] Filed: Feb. 8, 1996

[30] Foreign Application Priority Data

Feb. 21, 1995 [JP] Japan ................................. 7-056570
May 22, 1995 [JP] Japan ................................. 7-146724

[51] Int. Cl.$^6$ ........................................... G11B 17/04
[52] U.S. Cl. ................... 360/99.02; 360/96.5; 360/99.06; 369/77.2
[58] Field of Search ................... 360/97.02, 97.04, 360/99.02, 99.06, 133, 137; 369/77.1, 77.2, 291

[56] References Cited

U.S. PATENT DOCUMENTS

| | | | |
|---|---|---|---|
| 3,800,328 | 3/1974 | Harlan et al. | 360/137 |
| 4,360,907 | 11/1982 | Yamamura | 369/77.2 |
| 4,408,321 | 10/1983 | Yamamura | 369/77.2 |
| 4,493,517 | 1/1985 | Hillary | 439/140 |
| 4,691,257 | 9/1987 | Taguchi | 360/97.02 |
| 4,785,365 | 11/1988 | Ohkita | 360/96.5 |
| 4,817,079 | 3/1989 | Covington | 369/291 |
| 5,229,987 | 7/1993 | Aoki | 369/77.1 |
| 5,351,228 | 9/1994 | Kanno et al. | 369/77.2 |
| 5,355,358 | 10/1994 | Van Alfen | 369/77.1 |
| 5,408,459 | 4/1995 | Kawakuchi et al. | 369/77.2 |
| 5,463,984 | 11/1995 | Hubbard | 119/840 |
| 5,465,246 | 11/1995 | D'Alayer De Costemore D'Arc | 369/77.2 |
| 5,481,520 | 1/1996 | Tokoro | 369/77.2 |
| 5,537,389 | 7/1996 | Kuwa et al. | 360/133 |

FOREIGN PATENT DOCUMENTS

| | | |
|---|---|---|
| 0230375 | 7/1987 | European Pat. Off. . |
| 58-108003 | 6/1983 | Japan . |
| 62-47860 | 3/1987 | Japan . |
| 63-146267 | 6/1988 | Japan . |
| 57-169967 | 10/1992 | Japan ................... 369/77.2 |
| 5-4740 | 1/1993 | Japan . |
| 6-20357 | 1/1994 | Japan . |
| 6-5057 | 1/1994 | Japan . |
| 6-28837 | 2/1994 | Japan . |

OTHER PUBLICATIONS

United Kingdom Search Report.

*Primary Examiner*—Jefferson Evans
*Attorney, Agent, or Firm*—Greenblum & Bernstein P.L.C.

[57] ABSTRACT

A shutter mechanism for a disk drive includes at least one flat wire spring member inserted within lateral sides of opposing swingable shutters provided to a cartridge insertion opening to connect the shutters. The spring member swing the shutters closed when they are swingedly displaced from a neutral position. Regulating members control the range of the swingable shutters, and positions end portions of the shutters to guide an inserted disk cartridge to a waiting carriage for transporting the disk cartridge within the drive.

23 Claims, 7 Drawing Sheets

SHUTTER MECHANISM FOR DISK DRIVE CARTRIDGE INSERTION OPENING

BACKGROUND OF THE INVENTION

The present invention relates to a shutter structure of a disk drive for opening and closing a cartridge insertion slot through which a disk cartridge is inserted.

In a conventional device for recording and reproducing data from a disk-shaped recording media, the recording disk (optical, magnetic, or the like) is usually installed in a cartridge for protection from dust and dirt. The disk cartridge is inserted through an insertion slot into a disk drive when data is recorded or reproduced. The disk installed in the cartridge is rotated within the cartridge and read from or written to by a pickup head (again, optical, magnetic, or the like, as appropriate). The disk drive is sometimes provided with an insertion slot shutter for preventing dust or dirt entering into the disk drive. Inside the shutter, a cartridge carriage is provided, for transferring the disk cartridge to a reading/writing position. The disk drive is often provided with a shutter leaf large enough to completely cover the insertion slot. This shutter leaf may be rotatably supported to swing relative to the front insertion slot.

A conventional disk drive may have a mechanism to close the shutter after a disk is inserted or withdrawn. This closing mechanism may be linked to the movement of the carriage, which necessitates a complicated and bulky structure. Alternatively, the closing mechanism may be spring-loaded. However, conventional spring-loading mechanisms must be anchored, biased, and positioned appropriately relative to the drive chassis and shutter, and are thus difficult to assemble. Thus, conventional door closing mechanisms are complicated.

Furthermore, with the conventional shutter structure, the first guiding structure encountered by the disk cartridge as it enters the drive is the frame of the cartridge carriage, and misalignment is a common problem.

Still furthermore, clearance for swinging the shutter leaf inside the disk drive must be provided, so that the distance from the insertion slot to the cartridge holder must be longer than the swinging range of the shutter leaf. This increases the size of the disk drive.

SUMMARY OF THE INVENTION

It is therefore an object of the present invention to provide an improved shutter structure for an insertion slot of a disk drive capable of closing the insertion slot behind an inserted or removed cartridge with a simple structure.

It is a further object of the invention to provide an improved shutter structure for an insertion slot of a disk drive capable of guiding an inserted disk cartridge into a disk carriage with a simple structure.

In order to meet the objects of the invention, a shutter mechanism for a disk drive includes a housing having an insertion opening for inserting a disk cartridge. The insertion opening is formed in a vertical face of the housing. A plurality of pivot shafts are, provided along upper and lower edges, respectively, of the insertion opening. Upper and lower shutter leaves, swingably supported about the plurality of pivot shafts, respectively, swing into the disk drive. At least one spring member connects the first and second shutter leaves and biases the shutter leaves to swing to a vertical portion. The insertion opening is closed by the shutter leaves when the shutter leaves are vertically oriented.

Since at least one spring member connects the first and second shutter leaves, the connection to the first shutter leaf is the base for the biasing force to swing the second shutter leaf to a vertical orientation, and vice versa.

In one preferred embodiment, the spring member includes a base portion and a pair of opposing arm portions connected by the base portion, each of the arm portions to, and follows the motion of, a corresponding one of the shutter leaves. The spring member generates a resilient biasing force for returning the shutter leaves to the vertical orientation when the shutter leaves from the vertical orientation.

In one case, the connecting portion includes a straight base portion and two torsion shaft portions extending at right angles from opposite ends of the straight base portion. Each of the arm portions includes an L shaped arm extending at right angles from an end of a corresponding torsion shaft portion. The torsion shaft portions twist and generate a resilient biasing force for returning the shutter leaves to the vertical orientation when the L-shaped arms are displaced from a neutral condition.

In another case, the connecting portion includes a straight base portion and two folded portions extending at right angles from opposite ends of the straight base portion. Each of the folded portions is folded back upon itself toward the straight base portion. Each of the arm portions includes an L shaped arm extending at right angles from an end of a corresponding folded portion. The folded portions twist and generate a resilient biasing force for returning the shutter leaves to the vertical orientation when the L-shaped arms are displaced from a neutral condition.

Preferably, the arm portions are substantially coplanar when the shutter leaves are in the vertical orientation, and the spring member is in a neutral condition when the arm portions are substantially coplanar. Consequently, when an arm portion is displaced from a vertical orientation coplanar with the other arm portion, a returning biasing force is generated.

In a particular arrangement, a first spring member connects one lateral side of the first and second shutter leaves, and a second spring member connects an opposite lateral side of the first and second shutter leaves. Thus, a spring member provided to each side of the two shutter leaves provides a balanced and consistent biasing force.

In this preferred arrangement, each of the first and second shutter leaves has spring mounting grooves formed therein at both lateral sides. The first spring member is inserted into the spring mounting grooves of one lateral side of the first and second shutter leaves, and the second spring member is inserted into spring mounting grooves of the opposite lateral side of the first and second shutter leaves. In this manner, the spring members are easily mounted within the shutter leaves.

According to another aspect of the invention, a shutter mechanism for a disk drive includes a housing having an insertion opening for inserting a disk cartridge. The insertion opening is formed in a vertical face of the housing. First and second shutter leaves, are swingably supported to close the insertion opening when the leaves are in a vertical orientation(position). At least one spring member includes first and second resilient twistable portions coaxial with swinging axes of the first and second shutter leaves, respectively connecting portion connects the resilient twistable portions. First and second arm portions extend within the first and second shutter leaves, from the twistable portions toward swinging ends of the first and second shutter leaves. The arm portions follow swinging of the shutter leaves away from the vertical orientation. The resilient twistable. portions generate a biasing force to return the shutter leaves to the vertical orientation.

In this manner, the spring member within the shutter leaves returns the shutter leaves to the vertical orientation, closing the insertion opening in response to a displacement from the vertical orientation.

In one particular case, the twistable portions each include a torsion shaft portion extending at right angles from opposite ends of the connecting portion. Each of the arm portions includes an L shaped arm extending at right angles from an end of a corresponding torsion shaft portion.

In another particular case, the twistable portions each include a folded portion extending at right angles from opposite ends of the connecting portion. Each of the folded portions is folded back upon itself toward the connecting portion. Each of the arm portions includes an L shaped arm extending at right angles from an end of a corresponding folded portion.

Preferably, the arm portions are substantially coplanar when the shutter leaves are in the vertical orientation, and the spring member is in a neutral condition when the arm portions are substantially coplanar. If an arm portion within one or both shutter leaves is displaced from a vertical orientation coplanar with the other arm portion, a returning biasing force is generated to return the shutter leaves to the vertical orientation.

Preferably, a first spring member connects one lateral side of the first and second shutter leaves, and a second spring member connects an opposite lateral side of the first and second shutter leaves. Thus, a spring member provided within each side of the two shutter leaves provides a balanced and consistent biasing force. Each of the first and second shutter leaves has spring mounting grooves formed therein at both lateral sides. The first spring member is inserted into spring mounting grooves of one lateral side, while the second spring member is inserted into spring mounting grooves of the opposite lateral side. In this manner, the spring members are easily mounted within the shutter leaves.

According to still another aspect of the invention, a shutter structure in a disk drive includes a housing having an insertion opening for inserting a disk cartridge. The insertion opening is formed in a vertical face of the housing. First and second pivot shafts are provided at upper and lower edges, respectively, of the insertion opening. First and second shutter leaves, swingably supported about the first and second pivot shafts, respectively, swing into the disk drive. A resilient biasing mechanism biases the shutter leaves to swing to a vertical orientation. The insertion opening is closed by the shutter leaves when the shutter leaves are vertically oriented. At least one regulating member regulates a swinging angle of the shutter leaves toward the inside of the disk drive, and positions end portions of the shutter leaves to guide insertion of the cartridge.

In this manner, end portions of the shutter leaves, positioned by the regulating members, guide the insertion of a cartridge into the disk drive. The shutter leaves also serve to close the insertion opening against dust and debris.

In one particular case, the regulating members include projections formed on the vertical face. The projections horizontally protrude from the vertical face into the disk drive. Preferably, the regulating members include resilient stoppers for resiliently contacting the shutter leaves.

In another particular case, one of the first and second shutter leaves is shorter than the remaining one.

In one specific arrangement, the shutter mechanism further includes a cartridge carriage for transporting the cartridge within the housing. The end portions of the shutter leaves are aligned with internal surfaces of the cartridge carriage when the end portions are positioned to guide insertion of the cartridge. Thus, the cartridge is guided directly into the cartridge carriage as it is inserted through the shutter leaves.

According to yet another aspect of the invention, a shutter mechanism for a disk drive includes a housing having an insertion opening for inserting a disk cartridge. The insertion opening is formed in a vertical face of the housing. A movable cartridge carriage transports the disk cartridge within the housing. The cartridge carriage aligns selectively with the insertion opening. First and second shutter leaves are swingably supported to close the insertion opening in a vertical orientation and to swing into the disk drive. A resilient biasing mechanisms biases the shutter leaves to swing to the vertical orientation. At least one regulating member positions end portions of the shutter leaves to align with internal surfaces of the cartridge carriage to guide insertion of the cartridge.

In this manner, the cartridge is guided directly into the cartridge carriage by the end portions of the shutter leaves as it is inserted through the shutter leaves. The shutter leaves also serve to close the insertion opening against the intrusion of dust and debris.

Preferably, the regulating member or members further regulate a swinging angle of the shutter leaves toward the inside of the disk drive.

In one particular case, the regulating members include projections formed on the vertical face, the projections horizontally protruding from the vertical face into the disk drive. Preferably, the regulating members include resilient stoppers for resiliently contacting the shutter leaves. Further preferably, one of the first and second shutter leaves is shorter than a remaining one of the first and second shutter leaves.

DETAILED DESCRIPTION OF THE PREFERRED EMBODIMENTS

Figure 1:
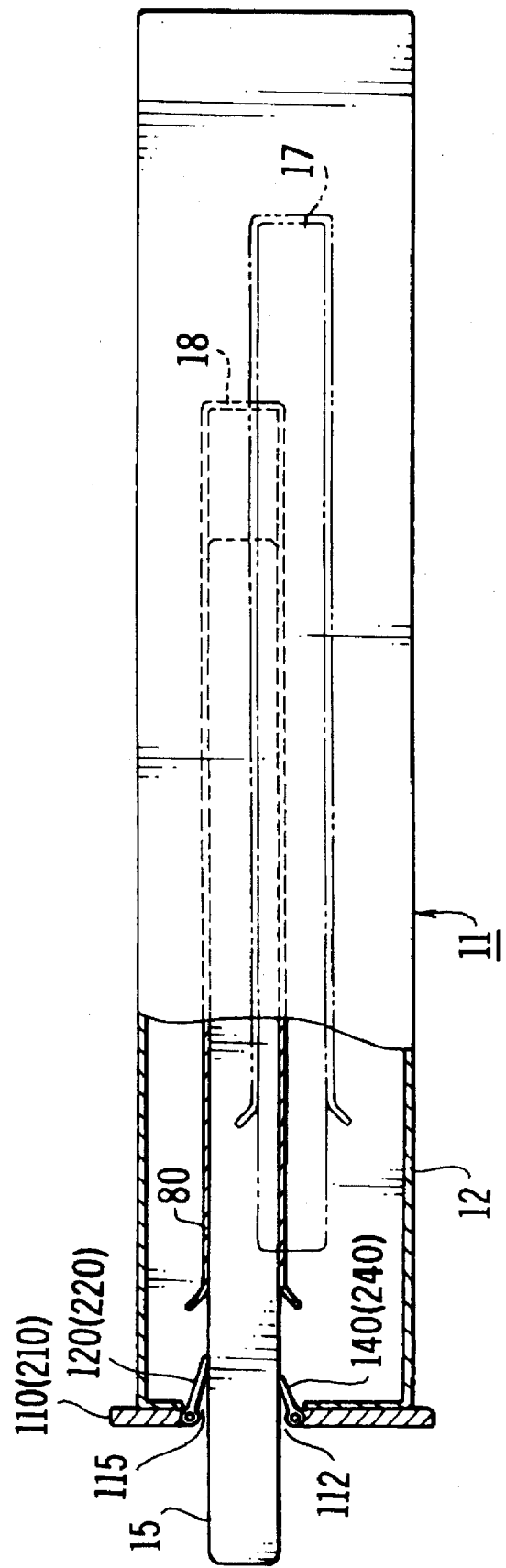
FIG. 1 is a partly sectioned side view showing a disk drive employing a first embodiment of the invention.

FIG. 1 is a partly sectioned side view showing a disk drive 11 employing a first embodiment of the invention. As shown in FIG. 1, an insertion slot 115, through which the disk drive cartridge 15 is inserted, is provided on the chassis 12 of the disk drive 11. A front bezel 110, having a bezel opening 112 substantially matching the insertion slot 115, is affixed to the front portion of the chassis 12. In the context of this specification, either a bezel opening or an insertion slot are defined as insertion openings. Upper and lower shutter leaves 120 and 140 are rotatably supported on the front bezel 110 to swing into and out of the disk drive 11. The upper shutter leaf 120 is longer (that is, from its swinging axis to its free end, and extends farther across the insertion slot 115 than the lower shutter leaf 140.

A carriage 80 for transferring the disk cartridge 15 to a reading/writing position 17 is aligned with the insertion slot 115 when a cartridge 15 is inserted or removed. The carriage 80 accepts the disk cartridge 15 at an insertion/ejection position 18 (shown by a dotted line) and transfers it to the reading/writing position 17 (shown by a double-dotted line) by means of a transfer mechanism (not shown). The disk within the cartridge 15 is read from or written to by means of a pickup head (not shown) at the reading/writing position 17. When the cartridge 15 is ejected, the carriage 80 moves the cartridge 15 to the insertion/ejection position 18.

Figure 2:
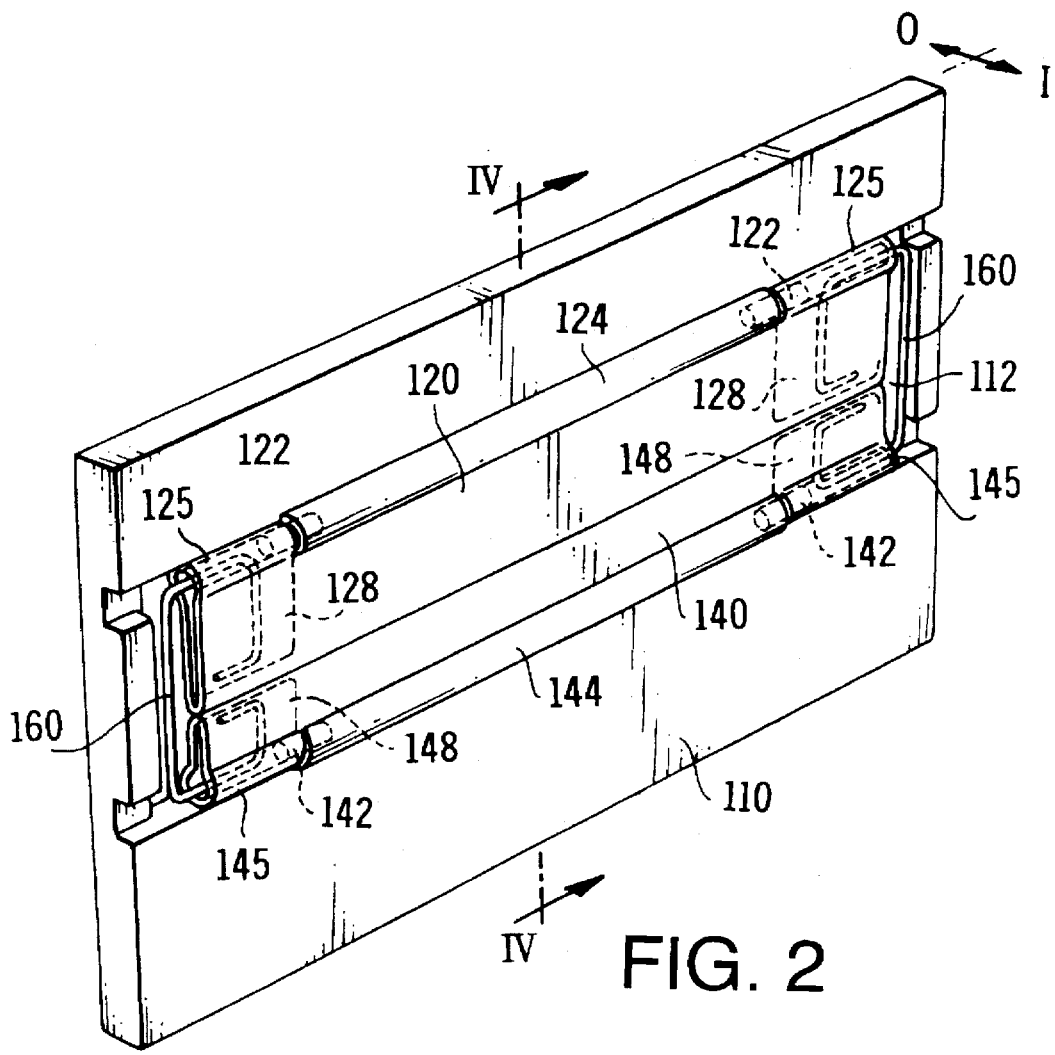
FIG. 2 is a perspective view showing a shutter structure according to the first embodiment of the invention.

FIG. 2 is a perspective view showing a shutter structure according to the first embodiment of the invention. The arrow I in the figure indicates the inside of the disk drive 11, while the arrow O indicates the outside of the disk drive 11.

As shown in FIG. 2, a guide hinge 124 is formed along the upper edge of the bezel opening 112. Holes for receiving two pivot shafts 122, 122 are formed at both lateral ends of the guide hinge 124 in its width direction. Cylindrically shaped pivot shaft sleeves 125, 125 are formed at both lateral end portions of the upper shutter leaf 120 in its width direction. The inner diameters of the pivot shaft sleeves 125, 125 are set to be slightly larger than the supporting pivot shafts 122, 122. The pivot shaft sleeves 125, 125 of the upper shutter leaf 120 bracket the guide hinge 124 from both lateral sides. In the context of this specification, "lateral" denotes left and right sides when looking at the front bezel with the shutters arranged such that one is above the other. The upper shutter leaf 120 is swingably supported by the guide hinge 124 (via the pivot shafts 122, 122 and pivot shaft sleeves 125, 125) to swing into and out of the disk drive 11. The lower shutter leaf 140 is similarly swingably supported by a guide hinge 144 along the lower edge of the bevel opening 112 (via pivot shafts 142, 142 and pivot shaft sleeves 145, 145) to swing into and out of the disk drive 11. Spring mount grooves 128, mounted at each lateral end of upper shutter leaf 120, 128 extend from the pivot shaft sleeves 125, 125 within the upper shutter leaf 120 to the vicinity of the unsupported end portion thereof, Similarly, spring mount grooves 148, 148 extend from the pivot shaft sleeves 145, 145 within the lower shutter leaf 140 to the vicinity of the unsupported end portion thereof.

Figure 3:
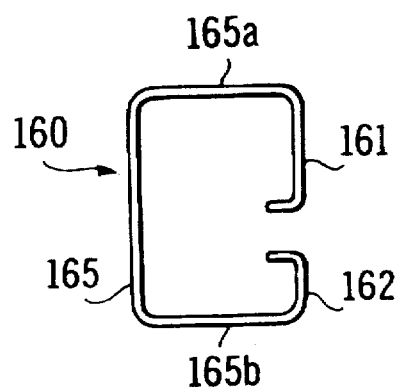
FIG. 3 shows the shape of spring members according to the first embodiment of the invention.

A spring member 160 is provided within each opposing lateral side of the shutter leaves 120 and 140. FIG. 3 shows the shape of the spring members 160. As illustrated in FIG. 3, the spring member 160 is a single spring wire bent in a plane, and includes an upper L-shaped arm portions 161 and a lower L-shaped arm portion 162 connected by a U-shaped connecting base portion 165. In a neutral condition, the L-shaped arm portions 161 and 162 (as well as the U-shaped connecting base portion 165) are coplanar. The arms of the U-shape of the connecting base portion 165 are fashioned as torsion shaft portions 165a and 165b. The torsion shaft portions 165a and 165b are separated from each other by a distance substantially equal to the distance between the guide hinges 124 and 144.

The torsion shaft portions 165a and 165b of each spring member 160 are inserted in the pivot shaft sleeves 125 and 145, respectively, on each lateral side of the bezel opening 112. Accordingly, the L-shaped arm portions 161 and 162 of each spring member 160 fit into the spring mount grooves 128 and 148 on each lateral side of the bezel opening 112. Thus, the torsion shaft portions 165a and 165b are substantially coaxial with the pivot shafts 122 and 142 (within the guide hinges 124 and 144) respectively. The L-shaped arm portions 161 and 162 extend from this coaxial position, and within the shutter leaves 120 and 140, respectively, to the unsupported ends of the shutter leaves 120 and 140.

In this manner, when the shutter leaves 120 and 140 are displaced (swung) from vertically oriented positions, the L-shaped arm portions 161 and 162 of the spring members 160 follow the swinging movement of the shutter leaves 120 and 140. The spring member 160 is elastically deformed such that the arm portions 161 and 162 are no longer coplanar. The elastic deformation is shared as elastic twisting of the torsion shaft portions 165a and 165b, and some bending of the connecting base portion 165 extending between the torsion shaft portions 165a and 165b. The connecting base portion 165 supports each individually twisting torsion shaft portion 165a and 165b with respect to the other. Consequently, a biasing force to restore the arm portions 161 and 162 to a coplanar position with the U-shaped base portion 165 is generated. The spring member 160 acts to bias the shutter leaves 120 and 140 to swing each toward an upright position.

Figure 4:
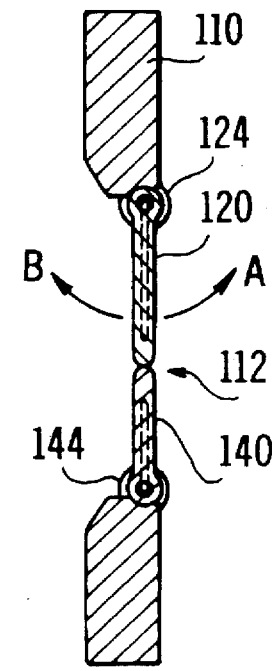
FIG. 4 shows a side sectional view of the shutter region, taken along line IV—IV of FIG. 2, with the spring members in their neutral positions.

FIG. 4 shows a side sectional view of the shutter region, taken along line IV—IV of FIG. 2, with the spring members 160 in their neutral positions. When the disk cartridge 15 is inserted into the disk drive 11 through the shutter leaves 120 and 140, the front end of the disk cartridge 15 presses and rotates the shutter leaves 120 and 140 toward the inside of the drive 11 (in the direction shown by arrows A in FIG. 4). The cartridge 15 passes the shutter leaves 120 and 140 when fully inserted, which allows them to close under the bias of the sprang members 160. When the disk cartridge 15 is removed from the disk drive 11 through the shutter leaves 120 and 140, the front end of the disk cartridge 15 presses and rotates the shutter leaves 120 and 140 toward the outside of the drive 11 (in the direction shown by arrows B in FIG. 4). Specifically, when a cartridge 15 is inserted or removed, the spring members 160 are elastically deformed following the motion of the shutter leaves 120 and 140. A resilient resisting force is generated by the spring members 160 to return the arm portions 161 and 162 to their neutral positions. Thus, the spring members 160 bias the shutter leaves 120 and 140 to rotate toward a vertically oriented position. When fully inserted into or removed from the drive 11, the cartridge 15 first clears the front end of the lower shutter leaf 140, since the lower shutter leaf 140 is shorter in the vertical direction than the upper shutter leaf 120. Consequently, the biasing force of the spring members 160 first closes the lower shutter leaf 140 behind a passing cartridge 15 fully inserted into or removed from the drive 11, followed by the upper shutter leaf 120.

Figure 5:
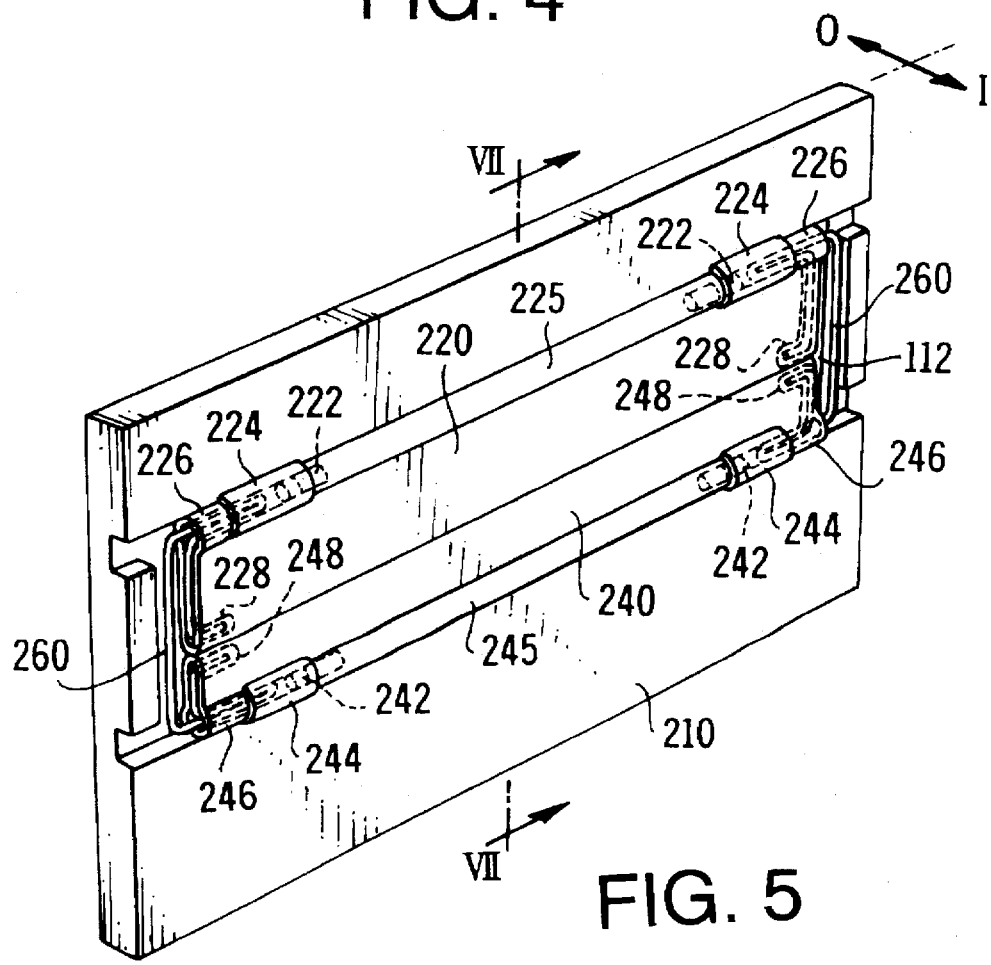
FIG. 5 is a perspective view showing a shutter structure according to the second embodiment of the invention.

FIG. 5 is a perspective view showing a shutter structure according to the second embodiment of the invention. The arrow I in FIG. 5 indicates the inside of the disk drive 11, while the arrow O indicates the outside of the disk drive 11. FIG. 1 is also representative of the second embodiment, showing an upper shutter leaf 220, a lower shutter leaf 240, and a front bezel 210 identified by parenthesized numerals.

As shown in FIG. 5, a pair of upper guide hinges 224, 224 are formed along the upper edge of the bezel opening 112 towards opposite lateral ends of the opening 112. An elongated supporting sleeve 225 is formed in the upper edge of the upper shutter leaf 220, between the upper guide hinges 224, 224. Spring mounting sleeves 226, 226 are formed on the outer lateral edges of the upper shutter leaf 220. Thus, each upper guide hinge 224 is bracketed by a spring mounting sleeve 226 on one side, and the support sleeve 225 on the other. Two pivot shafts 222, 222 support the supporting sleeve 225 relative to a respective upper guide hinge 224, 224, via a cylindrical hole formed in each upper guide hinge 224, 224. The inner diameter of the elongated supporting sleeve 225 is slightly larger than the supporting pivot shafts 222, 222. Thus, the upper shutter leaf 220 is swingably supported by the guide hinges 224, 224 (via the pivot shafts 222, 222 and supporting sleeve 225) to swing into and out of the disk drive 11. The lower shutter leaf 240 is similarly swingably supported by a pair of lower guide hinges 244, 244 along the lower edge of the bezel opening 112 (via pivot shafts 242, 242 and Supporting sleeve 245, 245) to swing into and out of the disk drive 11. Furthermore, each lower guide hinge 244 is bracketed by a spring mounting sleeve 246 on one side, and the supporting sleeve 245 on the other.

L-shaped spring mount grooves 228, 228 extend from the spring mounting sleeves 226, 226, respectively, within the upper shutter leaf 220 to the vicinity of the unsupported end portion thereof, at both lateral ends of the upper shutter leaf 220. Similarly, spring mount grooves 248, 248 extend from the pivot shaft sleeves 245, 245 within the lower shutter leaf 240 to the vicinity of the unsupported end thereof, at both lateral ends of the lower shutter leaf 240.

Figure 6:
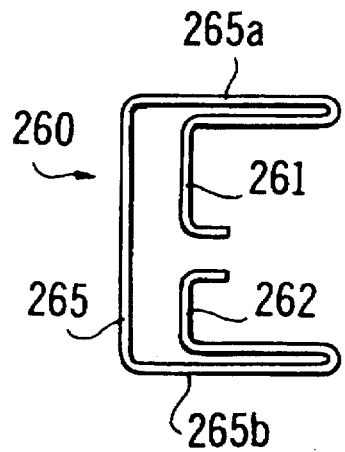
FIG. 6 shows the shape of spring members according to the second embodiment of the invention.

A spring member 260 is provided within each opposing lateral side of the shutter leaves 220 and 240. FIG. 6 shows the shape of the spring members 260. As illustrated in FIG. 6 each spring member 260 is a single spring wire bent in a plane. Spring member 260 includes an upper L-shaped arm portion 261 connected to lower L-shaped arm portion 262 connected by a base portion 265. The connecting base portion 265 includes an upper folded portion 265a and a lower folded portion 265a. Each of the upper and lower folded portions 265a and 265b is folded back upon itself, and the L-shaped arm portions 261 and 262 extend therefrom. In a neutral condition, the L-shaped arm portions 261 and 262 (as well as the connecting base portion 265, and including the folded portions 265a and 265b) are coplanar. The folded portions 265a and 265b are separated from each other by a distance substantially equal to the distance between the guide hinges 224 and 244.

The folded portions 265a and 265b of each spring member 260 are inserted in the spring mounting sleeves 226 and 246, respectively, on each lateral side of the bezel opening 112, and extend into the guide hinges 224 and 244, respectively. Accordingly, the L-shaped arm portions 261 and 262 of each spring member 260 fit into the spring mount grooves 228 and 248 on each lateral side of the bezel opening 212. The folded portions 265a and 265b are substantially coaxial with the pivot shafts 222 and 242 (within the guide hinges 224 and 244) respectively. The L-Shaped arm portions 261 and 262 extend from this coaxial position, and within the shutter leaves 220 and 240, respectively, to the unsupported ends of the shutter leaves 220 and 240.

When the shutter leaves 220 and 240 are displaced (swing) from vertically oriented positions, the L-shaped arm portions 261 and 262 of the spring members 260 follow the swinging movement of the shutter leaves 220 and 240. The spring member 260 is elastically deformed such that the arm portions 261 and 262 are no longer coplanar with the base portion 265 or each other. The elastic deformation is shared between an elastic twisting of the folded portions 265a and 265b, and some bending of that part of the base portion 265 connecting the folded portions 265a and 265b. The twisting of each folded portion 265a and 265b is distributed between the portion connected to the base portion 265 (on one side of the fold) and the portion connected to the respective L-shaped arm 261 or 262. Consequently, the amount of twisting per unit of length of wire is less for in the second embodiment than for the first, as part of the elastic deformation is shared between the portions on either side of the fold in each of the folded portions 265a and 265b. Furthermore, the amount of bending of the connecting part of the base portion 265 is reduced in comparison to the first embodiment.

The connecting base portion 265 supports each individually twisting folded portion 265a and 265b with respect to the other. Consequently, a biasing force to restore the arm portions 261 and 262 to coplanar alignment with the base portion 265 is generated. The spring member 260 thus acts to bias the shutter leaves 220 and 240 to each swing toward an upright position.

Figure 7:
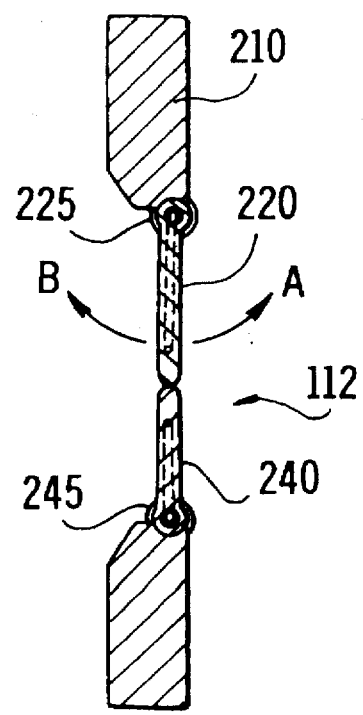
FIG. 7 shows a side sectional view of the shutter region, taken along line VII—VII of FIG. 5, with the spring members in their neutral positions.

FIG. 7 shows a side sectional view of the shutter region, taken along line VII—VII of FIG. 5, with the spring members 260 in their neutral positions. When the disk cartridge 15 is inserted into the disk drive 11 through the shutter leaves 220 and 240, the front end of the disk cartridge 15 presses and rotates the shutter leaves 220 and 240 toward the inside of the drive 11 (in the direction shown by arrows A in FIG. 7). The cartridge 15 passes the shutter leaves 220 and 240 as it is fully inserted, and allows them to close under the bias of the spring members 260. When the disk cartridge 15 is removed from the disk drive 11 through the shutter leaves 220 and 240, the front end of the disk cartridge 15 presses and rotates the shutter leaves 220 and 240 toward the outside of the drive 11 (in the direction shown by arrow B in FIG. 7). Specifically, when a cartridge 15 is inserted or removed, the spring members 260 are elastically deformed following the motion of the shutter leaves 220 and 240. Resilient resisting force is generated by the spring members 260 to return the arm portions 261 and 262 to their neutral positions. Thus, the spring members 260 bias the shutter leaves 220 and 240 to rotate toward a vertically oriented position. When fully inserted into or removed from the drive 11, the cartridge 15 first clears the front end of the lower shutter leaf 240, since the lower shutter leaf 240 is shorter in the vertical direction than the upper shutter leaf 220. Consequently, the biasing force of the spring members 260 first closes the lower shutter leaf 240 behind a cartridge 15 fully inserted into or removed from the drive 11, followed by the upper shutter leaf 220.

Figure 8:
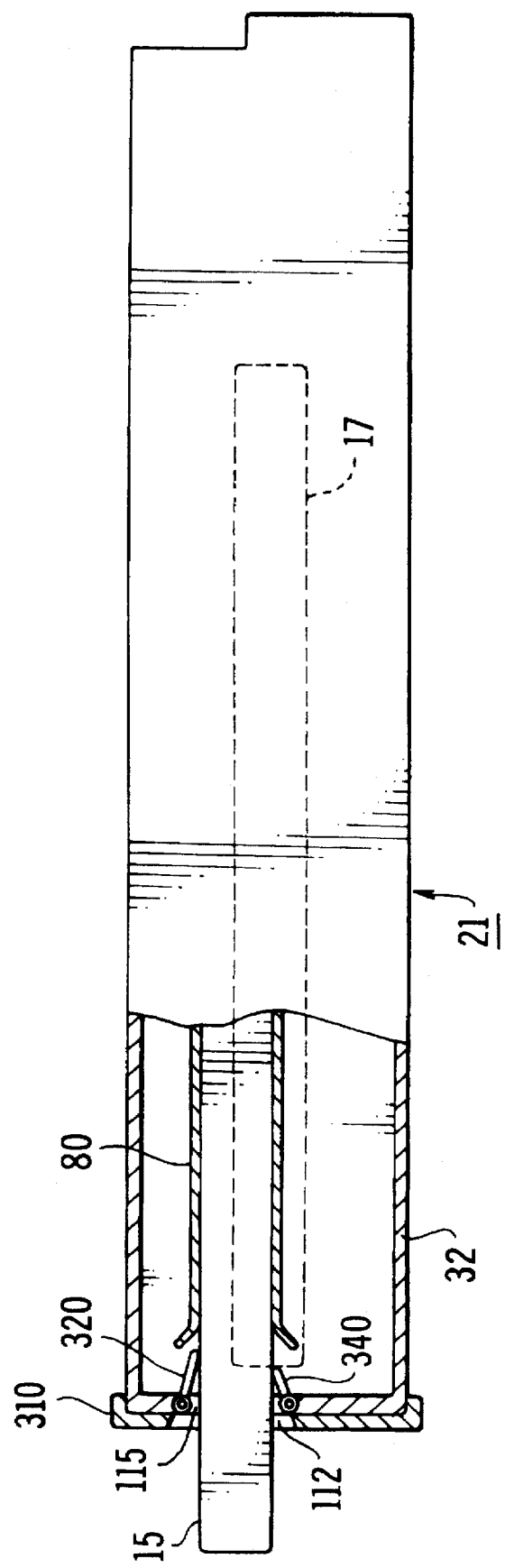
FIG. 8 is a partly sectioned side view showing a disk drive employing a third embodiment of the invention.

FIG. 8 is a partly sectioned side view showing a disk drive 21 employing a third embodiment of the invention. As shown in FIG. 8, an insertion slot 115 through which the disk drive cartridge 15 is inserted is provided on the chassis 32 of the disk drive 21. A front bezel 310, having a bezel opening 112 substantially matching the insertion slot 115, is affixed to the front portion of the chassis 32. Upper and lower shutter leaves 320 and 340 are rotatably supported on the chassis 32 to swing into and out of the interior of the disk drive 21. The upper shutter leaf 320 is longer (that is, in the direction from its swinging axis to its free end), and covers a larger portion of the insertion slot 115 than the lower shutter leaf 340.

A carriage 80 for transferring the disk cartridge 15 to a reading/writing position 17 is aligned with the insertion slot 115 when a cartridge 15 is being inserted or removed. The carriage 80 accepts the disk cartridge 15 at an insertion/ ejection position (shown in solid lines) and transfers it to the reading/writing position 17 (shown by a dashed line) by means of a transfer mechanism (not shown). The disk within the cartridge 15 is read from or written to by means of a pickup head (not shown) at the reading/writing position 17. When the cartridge 15 is ejected, the carriage 80 moves the cartridge 15 to the insertion/ejection position.

Figure 9:
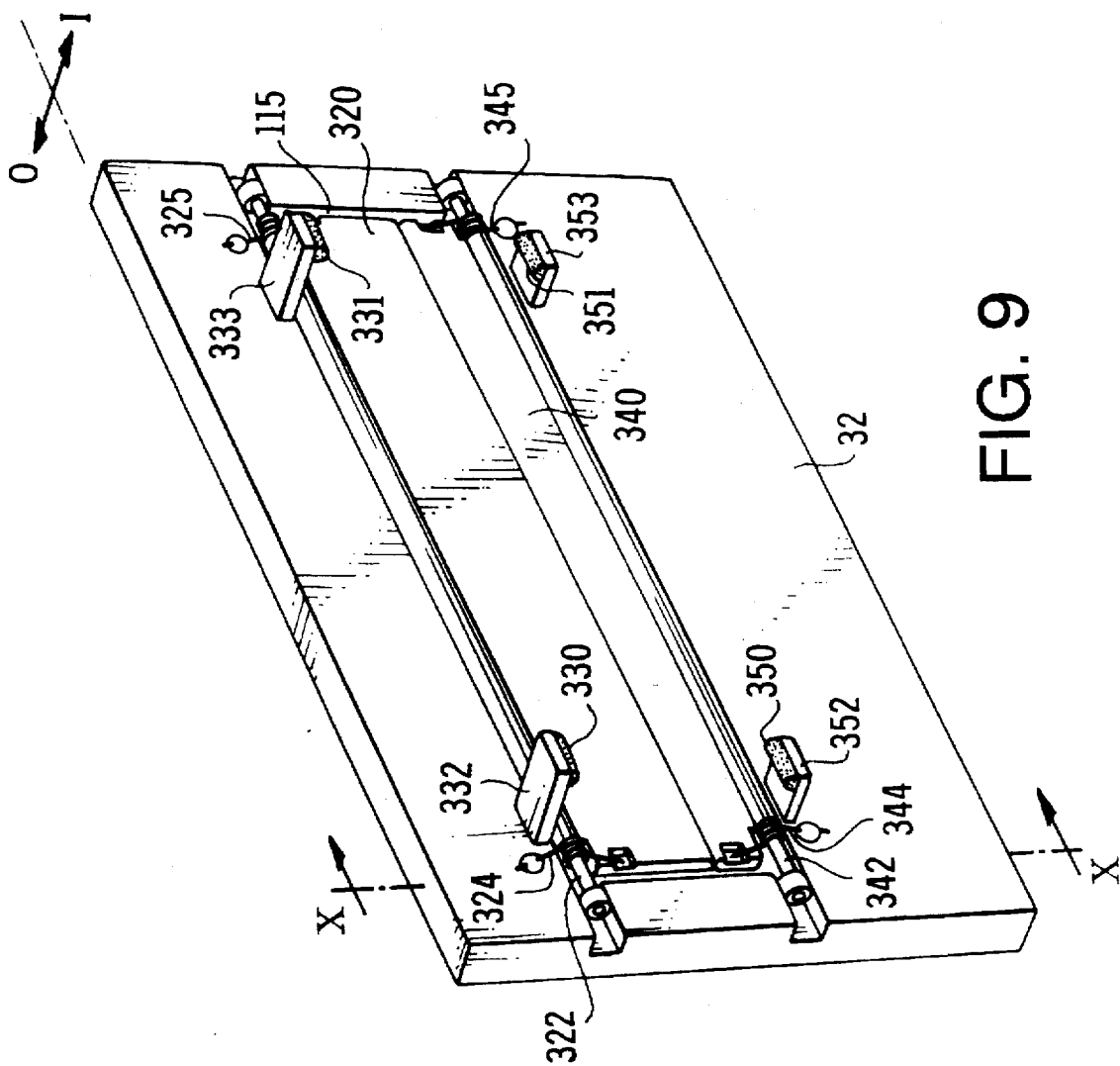
FIG. 9 is a perspective view showing a shutter structure according to the third embodiment of the invention.

FIG. 9 is a perspective view showing a shutter structure according to the third embodiment of the invention. The inside of the disk drive 21 is indicated by an arrow I, while the outside of the drive is indicated by an arrow O. The upper shutter leaf 320 and the lower shutter leaf 340 are provided with pivot shafts 322 and 342 respectively. Bearings for supporting the pivot shafts 322 and 342 are fixed to a recessed portion formed on the chassis 32. Thus, each of the upper and lower shutter leaves 320 and 340 are swingably supported.

Torsion springs 324 and 325 are wound on the pivot shafts 322, 322 at lateral sides of the upper shutter leaf 320. One end of each of the torsion springs 324 and 325 is adhered to the front interior surface of the chassis 32, and the remaining end is adhered to the shutter leaf 320. The neutral position of the torsion springs 324 and 325 is achieved at a vertical orientation of the upper shutter leaf 320 (i.e., the position shown in FIG. 9). When the shutter leaf 320 is swung inward or outward, the torsion springs 324 and 325 generate a resilient biasing force to close the upper shutter leaf 320.

The lower shutter leaf 340 is similarly resiliently biased by torsion springs 344 and 345 (similarly attached to the chassis 32 and shutter leaf 340) such that their neutral position is a vertical position of the lower shutter leaf 340 (i.e., the position shown in FIG. 9). Accordingly, when the shutter leaf 340 is swung inward or outward, a resilient biasing force is generated by the torsion springs 344 and 345 to close the lower shutter leaf 340.

As shown in FIG. 9, two upper stopper support plates 332 and 333 horizontally project toward the inside of the disk drive at the upper portion of the insertion slot 115 inside the chassis frame 32. Shutter stoppers 330 and 331, made of resilient cushioning material, project downwardly at the distal ends of the upper stopper support plates 332 and 333, respectively. Similarly, two lower stopper support plates 352 and 353 horizontally project toward the inside of the disk drive at the lower portion of the insertion slot 115 inside the chassis frame 32. Shutter stoppers 350 and 351, made of resilient cushioning material, project upwardly at the distal ends of the lower stopper support plates 352 and 353, respectively. When the front end of the disk cartridge 15 is inserted and pressed against the closed shutter leaves 320 and 340, the upper shutter leaf 320 swings upwardly, and rotates until it contacts the shutter stoppers 330 and 331. Similarly, the lower shutter leaf 340 swings downwardly, and rotates until it contacts the shutter stoppers 350 and 351.

Figure 10:
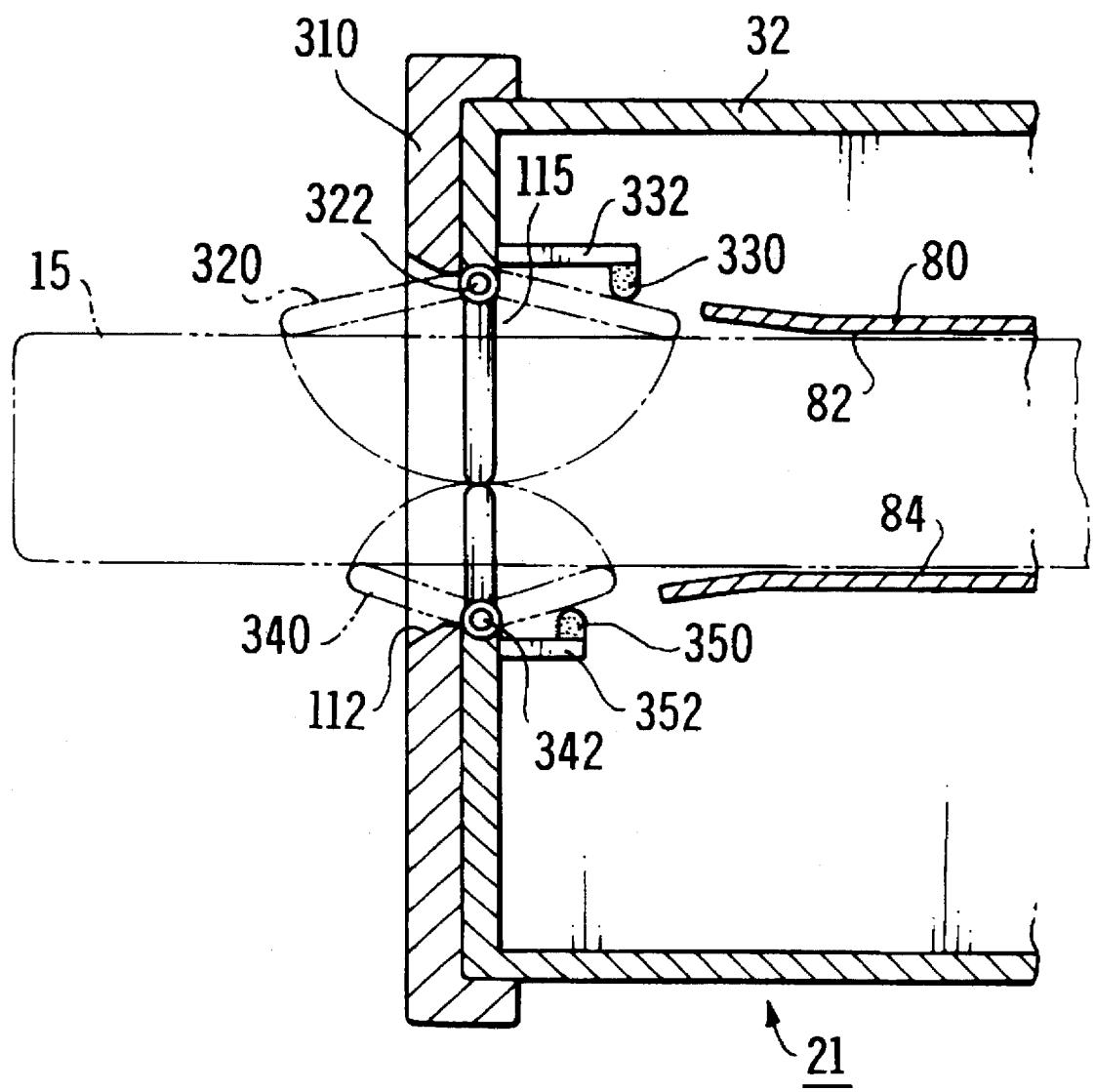
FIG. 10 is a side sectional view taken along the section line X—X of FIG. 9, showing the shutter portion.

FIG. 10 is a side sectional view taken along the section line X—X of FIG. 9, showing the shutter portion. As shown in FIG. 10, when the upper shutter leaf 320 is open, and abuts the shutter stoppers 330 and 331, the unsupported swinging end of the shutter leaf 320 and an upper inner surface 82 of the cartridge carriage 80 are at aligned at the same level. Similarly, when the lower shutter leaf 340 is open, abutting the shutter stoppers 350 and 351, the unsupported swinging end of the lower side leaf 340 and a lower inner surface 84 of the cartridge carriage 80 are aligned at the same level.

Thus, when the front end of the disk cartridge 15 is inserted and pressed against the closed shutter leaves 320 and 340, the shutter leaves 320 and 340, in combination with the stoppers 330, 331, 350, and 351, guide the insertion of the disk cartridge 15 into the carriage 80. Accordingly, even if the disk cartridge 15 is inclined from a horizontal posture when inserted, the shutter leaves 320 and 340 guide the cartridge 15 from the upper and lower sides so that the disk cartridge 15 can be inserted into the carriage 80 without interfering with the carriage 80.

When the disk cartridge 15 inserted through the insertion slot 115 reaches a predetermined position within the carriage 80, a loading mechanism (not shown) moves the carriage 80 to transfer the cartridge 15 toward the reading/writing position 17. When fully inserted into or removed from the drive 21, the cartridge 15 first clears the unsupported swinging end of the lower shutter leaf 340, since the lower shutter leaf 340 is shorter in the vertical direction than the upper shutter leaf 320. Accordingly, the lower leaf 340 returns to its closed position behind a passing cartridge 15 when fully inserted or removed, before leaf 320 and thereafter the upper leaf 320 returns to its closed position. In this condition, data is read from and/or written to the disk. The cartridge 15 is discharged from the carriage 80 by means of a discharging mechanism (not shown). When the cartridge 15 is discharged, the shutters 320 and 340 open outwardly of the front bezel 310 as they are pressed by the disk cartridge 15. When the disk cartridge 15 protrudes from the bezel 310 by a predetermined amount, the discharging mechanism stops, and the disk cartridge 15 may be withdrawn by hand. Similar to the insertion, process the cartridge 15 first clears the front end of the lower shutter leaf 340, followed by the unsupported swinging end of the upper shutter leaf 320.

As described above, according to the shutter structure of the third embodiment of the invention, the swinging angle of a pair of swingable shutter leaves is regulated by the shutter stoppers, guiding the disk cartridge into the cartridge carriage, so that the disk cartridge can be easily inserted into the disk drive. Furthermore, the distance between the shutters and the carriage can be smaller than a device with only one shutter leaf, reducing the size of the disk drive device. Still further, since the lower shutter leaf is shorter than the upper shutter leaf, upon discharging of the cartridge, the lower shutter leaf closes first, preventing the intrusion of dust or debris into the drive.

It should be noted that although in each of the embodiments the pivot shafts of the shutter leaves are arranged horizontally, and the closed position of the shutter leaves is described as vertical, this description relates to embodiments of a disk drive according to the invention in which a cartridge is inserted such that the flat faces of the disk therein are horizontal. However, the invention may be applied to alternative arrangements having a vertical face with an insertion opening therein through which a disk cartridge is inserted. Accordingly, a vertically oriented drive with a structure as noted, having a disk held in the inserted cartridge arranged such that the flat faces are horizontal, pivot shafts arranged vertically and the shutter leaves vertical but perpendicular to cartridge insertion when closed, and does not depart from the spirit or scope of the invention.

The present disclosure relates to subject matter contained in Japanese Patent Application Nos. HEI 07-056570, filed on Feb. 21, 1995, and HEI 07-146724, filed on May 22, 1995, which are expressly incorporated herein by reference in their entireties.

What is claimed is:

1. A shutter mechanism for a disk drive, comprising:
   a housing having an insertion opening for receiving a disk cartridge, said insertion opening being formed in a vertical face of said housing;

a plurality of pivot shafts, provided along upper and lower edges, of said insertion opening;

first and second shutter leaves, swingably supported about said plurality of pivot shafts, respectively, to swing into said disk drive; and at least one spring member connecting said first and second shutter leaves, for biasing said shutter leaves to a vertical position relative to said housing, said insertion opening being closed by said first and second shutter leaves when said first and second shutter leaves are in said vertical position; and said at least one spring member extending within a plane when in a neutral state, movement of said at least one spring member out of said plane generating a said force biasing first and second shutter leaves towards said vertical position.

2. The shutter mechanism according to claim 1, wherein said at least one spring member comprises:

a base portion; and a pair of opposing arm portions connected by said base portion, each of said pair of arm portions being connected to, and following a motion of, a corresponding one of said first and second shutter leaves;

wherein said spring member generates a resilient biasing force for returning said first and second shutter leaves to said vertical position when said first and second shutter leaves are spaced from said vertical position.

3. The shutter mechanism according to claim 2, further comprising:

said base portion including a straight portion and two torsion shaft portions extending at right angles from opposite ends of said straight portion; and each of said pair of arm portions including an L-shaped arm extending at right angles from an end of a corresponding one of said two torsion shaft portions.

4. The shutter mechanism according to claim 3, wherein said two torsion shaft portions twist and generate a resilient biasing force for returning said first and second shutter leaves to said vertical position when said L-shaped arms are displaced from a neutral position.

5. The shutter mechanism according to claim 2, further comprising:

said base portion including a straight portion and two folded portions extending at right angles from opposite ends of said straight portion, each of said two folded portions being folded back upon itself toward said straight portion; and each of said pair of arm portions including an L-shaped arm extending at right angles from an end of a corresponding one of said two folded portions.

6. The shutter mechanism according to claim 5, wherein said two folded portions twist and generate a resilient biasing force for returning said first and second shutter leaves to said vertical position when said L-shaped arms are displaced from a neutral position.

7. The shutter mechanism according to claim 2, wherein said pair of arm portions are substantially coplanar when said first and second shutter leaves are in said vertical position, and said spring member is in a neutral position when said pair of arm portions are substantially coplanar.

8. The shutter mechanism according to claim 2, wherein said at least one spring member is a single spring wire bent to form said base portion and said pair of arm portions.

9. The shutter mechanism according to claim 8, wherein said base portion of said at least one spring member is provided with first and second shaft portions substantially coaxial with swinging axes of said first and second shutter leaves, respectively.

10. The shutter mechanism according to claim 1, wherein said at least one spring member includes a first spring member connecting one lateral side of said first and second shutter leaves, and a second spring member connecting an opposite lateral side of said first and second shutter leaves.

11. The shutter mechanism according to claim 10, wherein each of said first and second shutter leaves has spring mounting grooves formed therein at both lateral sides, said first spring member being inserted into said spring mounting grooves of said one lateral side of said first and second shutter leaves, and said second spring member being inserted into spring mounting grooves of said opposite lateral side of said first and second shutter leaves.

12. The shutter mechanism according to claim 1, wherein one of said first and second shutter leaves is shorter, in a direction from a swinging axis to an end portion of said one of said first and second shutter leaves, than a remaining one of said first and second shutter leaves.

13. The shutter mechanism according to claim 12, wherein a cartridge passing through said first and second shutter leaves first clears said end portion of said one of said first and second shutter leaves, and said biasing means first closes said one of said first and second shutter leaves behind said cartridge after said cartridge passes said first and second shutter leaves.

14. A shutter mechanism for a disk drive, comprising:

a housing having an insertion opening for receiving a disk cartridge, said insertion opening being formed in a vertical face of said housing;

first and second shutter leaves, swingably supported to close said insertion opening when said leaves are in a vertical position with respect to said housing; and at least one spring member, said spring member including:

first and second resilient twistable portions coaxial with swinging axes of said first and second shutter leaves, respectively;

a connecting portion connecting said first and second resilient twistable portions; and first and second arm portions extending within said first and second shutter leaves from said first and second twistable portions toward swinging ends of said first and second shutter leaves, respectively, wherein said first and second arm portions move with said first and second shutter leaves away from said vertical position, whereby said first and second resilient twistable portions generate biasing force to return said first and second shutter leaves to said vertical position.

15. The shutter mechanism according to claim 14, further comprising:

said first and second twistable portions each including a torsion shaft portion extending at right angles from opposite ends of said connecting portion; and each of said first and second arm portions includes an L-shaped arm extending at right angles from an end of a corresponding one of said first and second torsion shaft portions.

16. The shutter mechanism according to claim 14, wherein said first and second twistable portions each include a folded portion extending at right angles from opposite ends of said connecting portion, each of said folded portions being folded back upon itself toward said connecting portion; and wherein each of said arm portions includes an L-shaped arm extending at right angles from an end of a corresponding folded portion.

17. The shutter mechanism according to claim 14, further comprising:

a plurality of pivot shafts, provided along upper and lower edges, respectively, of said insertion opening, for swingably supporting said first and second shutter leaves to swing into and out of said disk drive.

18. The shutter mechanism according to claim 14, wherein said first and second arm portions are substantially coplanar when said first and second shutter leaves are in said vertical position, and said at least one spring member is in a neutral position when said first and second arm portions are substantially coplanar.

19. The shutter mechanism according to claim 14, wherein said at least one spring member includes a first spring member connecting one lateral side of said first and second shutter leaves, and a second spring member connecting an opposite lateral side of said first and second shutter leaves.

20. The shutter mechanism according to claim 19, wherein each of said first and second shutter leaves has spring mounting grooves formed therein at both lateral sides, said first spring member is inserted into spring mounting grooves of one lateral side of said first and second shutter leaves, and said second spring member being inserted into spring mounting grooves of said opposite lateral side of said first and second shutter leaves.

21. The shutter mechanism according to claim 14, wherein said at least one spring member is a single spring wire bent to form said connecting portion and said first and second arm portions.

22. The shutter mechanism according to claim 14, wherein one of said first and second shutter leaves is shorter, in the direction from a swinging axis to said end portion of said one of said first and second shutter leaves, than a remaining one of said first and second shutter leaves.

23. The shutter mechanism according to claim 22, wherein a cartridge passing through said first and second shutter leaves first clears an end portion of said one of said first and second shutter leaves, and said biasing means first closes said one of said first and second shutter leaves behind said cartridge.

* * * * *